Sept. 20, 1971 E. E. METZGER 3,605,778

VARIABLE DELAY LINE OSCILLATOR

Filed March 4, 1969

INVENTOR
ERIC E. METZGER

BY Hurvitz, Rose & Greene

ATTORNEYS

United States Patent Office 3,605,778

Patented Sept. 20, 1971

3,605,778

VARIABLE DELAY LINE OSCILLATOR

Eric E. Metzger, Silver Spring, Md., assignor to Bowles Fluidics Corporation, Silver Spring, Md.

Filed Mar. 4, 1969, Ser. No. 804,086
Int. Cl. F15c 1/04
U.S. Cl. 137—81.5 15 Claims

ABSTRACT OF THE DISCLOSURE

The frequency of a negative feedback type fluidic oscillator is rendered variable by introducing control fluid flow to either aid or oppose the feedback flow. The control fluid flows adjacent, about or within the feedback fluid in an enlarged section of the feedback passage, and may have a variable flow rate which frequency-modulates the oscillator output signal. The oscillator may be employed as a flow sensor when the control fluid is supplied from the flow being monitored. Alternatively, if the enlarged section of the feedback passage is curved about a predetermined axis, rotation of the system about that axis introduces control flow variations which vary the oscillator frequency as a function of angular acceleration of the system about that axis.

BACKGROUND OF THE INVENTION

The present invention relates to fluidic oscillators of the negative feedback type, and more particularly to modifications for such oscillators which permit their utilization in a variety of applicatons, such as a frequency modulator, an angular accelerometer and a flow sensor.

There are numerous configurations of fluidic oscillators known to the prior art. The particular types of fluidic oscillators with which this invention is concerned are those in which the frequency of operation is determined, at least in part, by the transit time of a negative feedback signal through a negative feedback fluid passage. If the velocity of the negative feedback signal in this type oscillator could be selectively varied, the oscillator frequency could be changed accordingly. Similarly, if the velocity of the negative feedback signal could be varied in response to a parameter in a fluidic system, the oscillator frequency would provide a measure of that parameter.

Accordingly, it is an object of the present invention to provide a technique for selectively varying the velocity of the negative feedback signal in a negative feedback fluidic oscillator to correspondingly vary the oscillator frequency.

It is another object of the present invention to provide a fluidic oscillator of the negative feedback type in which the negative feedback signal velocity and hence the oscillator frequency is rendered variable in response to a parameter of a fluidic system.

It is still another object of the present invention to provide a technique for varying the velocity of a negative feedback signal in a negative feedback type fluidic oscillator in response to the rate of flow of fluid in a channel so that the oscillator frequency is a measure of the fluid flow rate in the channel.

It is still another object of the present invention to provide a technique for varying the flow rate of fluid in the negative feedback passage of a negative feedback fluidic oscillator in response to angular acceleration of the oscillator about a predetermined axis such that the oscillator frequency provides a measure of the angular acceleration.

It is still another object of the present invention to provide a novel fluidic frequency modulator wherein the negative feedback signal in a negative feedback type fluidic oscillator is selectively varied in response to an input command signal to correspondingly vary the oscillator frequency.

SUMMARY OF THE INVENTION

In accordance with the principles of the present invention the negative feedback passage of a negative feedback type fluidic oscillator has a section through which externally-supplied control fluid is caused to flow to change the negative feedback signal flow rate. The control fluid flow may be directed to either aid or oppose the negative feedback flow, producing a corresponding increase or decrease of the negative feedback flow velocity. Changes in the negative feedback flow rate produce concomitant changes in the oscillator frequency which thereby provides a measure of the flow rate of the control fluid. The control fluid may be a fluid stream whose velocity is to be sensed, in which case the variation in the feedback signal velocity, as indicated by the variation in the oscillator frequency, provides a measure of the flow rate of the control fluid. If the section of the feedback passage is curved about an axis, angular acceleration of the system about the axis produces variations in the flow rate of the control fluid which in turn produce a change in the feedback signal velocity and the oscillator frequency. Additionally, if the flow rate of the modulating signal is made to vary in response to some intelligence-bearing information, the output signal of the oscillator will be frequency modulated in accordance with the intelligence represented by the signal.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DETAILED DESCRIPTION OF THE PREFERRED EMBODIMENTS

Figures 1, 2, 3:
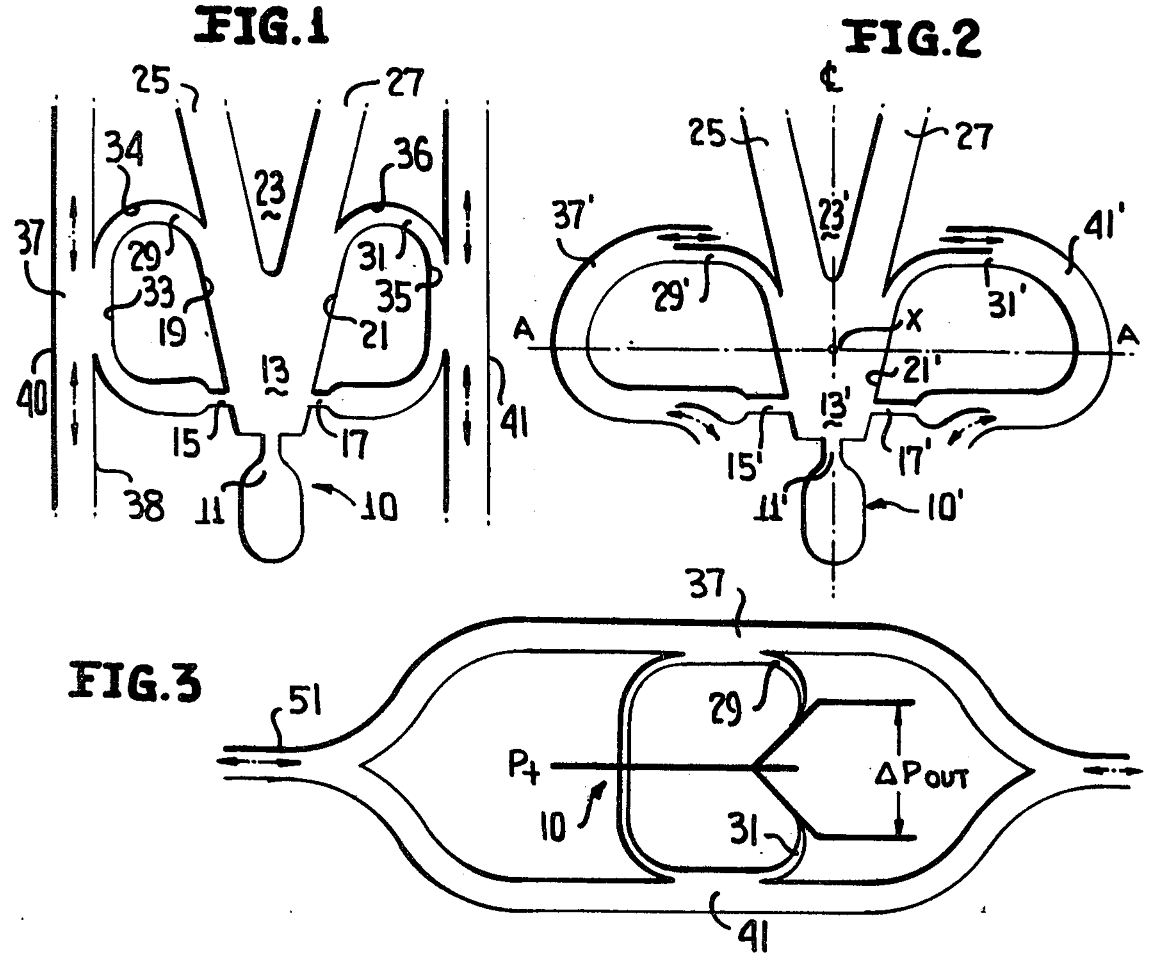
FIG. 1 is a plan view of a preferred embodiment of the variable delay feedback oscillator of the present invention.
FIGS. 2 and 3 are respective plan views of alternate embodiments of the present invention.

Referring now specifically to FIG. 1 of the accompanying drawings, there is illustrated a fluidic negative feedback oscillator 10, modified in accordance with the principles of the present invention. As is conventional in the fluidic art, the various passages, nozzles, etc. comprising part of amplifier 10 may be formed by molding or etching a plate which is sandwiched between a pair of cover plates in fluid tight relationship. A power nozzle 11 is responsive to application of pressurized fluid thereto for issuing a power stream of fluid into interaction chamber 13. Substantially opposed left and right control nozzles 15 and 17 respectively communicate with the interaction chamber 13 downstream and transversely of power nozzle 11. Control nozzles 15 and 17 are responsive to application of pressurized fluid thereto for issuing respective control streams which interact with the power stream in chamber 13 to deflect the power stream accordingly. Left and right side walls 19 and 21, respectively, through which respective control nozzles 15 and 17 communicate with chamber 13, are set back a predetermined distance from the power nozzle 11 so that the power stream, due to the Coanda effect, may attach to either side wall in a manner well known in the fluidics art. Side walls 19 and 21 diverge in a downstream direction. A flow divider 23, having its apex positioned in substantial alignment with power nozzle 11, divides the downstream end of chamber 13 into left and right output passage 25 and 27 respectively.

A left feedback channel 29, having an ingress orifice defined through left side wall 19, communicates between left output passage 27 and left control nozzle 15. Likewise, right feedback passage 31 has an ingress orifice defined through right side wall 21 and communicates between right output passages 27 and right control nozzle 17.

The operation of oscillator 10, as thus far described, is well known in the fluidics art. Assuming that oscillator 10 is symmetrical about a longitudinal axis extending centrally through power nozzle 10 and the apex of flow divider 23, the power stream issuing from power nozzle 11 is initially deflected toward one or the other of side walls 19, 21, due to random pressure perturbations which exist transversely to the power stream. Assuming the power stream initially attaches to left side wall 19, a portion of the power stream received by outlet passage 25 is fed back via left feedback passage 29 to control nozzle 15 so as to deflect the power stream toward right side wall 21 to which it attaches. A portion of the power stream is then fed back via right feedback passage 31 to right control nozzle 17 to in turn re-deflect the power stream back toward left side wall 19. The power stream is thus seen to oscillate back and forth between output passages 25 and 27 at a frequency which is determined in part by the length of time required for the feedback fluid to traverse the feedback passages 29 and 31. As is well known, the oscillator need not be symmetrical about a longitudinal centerline to provide the requisite oscillations; that is, asymmetry of oscillator construction, if desired, could produce asymmetric oscillation.

Feedback passage 29 is defined by opposing interior and exterior side walls 33 and 34; similarly, feedback passage 31 is defined by opposing interior and exterior side walls 35 and 36. Exterior walls 34 and 36 are cut away along respective portions of feedback passages 29 and 31, the feedback signal being directed generally along respective interior side walls 33 and 35. A left control flow channel 37 is provided, having opposing channel side walls 38 and 40, side wall 38 having a cutout portion which is superposed on the cutout portion of feedback channel 29. The coincident cutout portions of feedback passage 29 and flow channel 37 permit fluid communication between the two flow conduits. Flow through control channel 37, depending upon its direction, interacts with the feedback signal in passage 29 to change the velocity of the feedback signal in accordance with the velocity of the control flow. A right control flow channel 41 is disposed in like manner adjacent feedback passage 31.

The length of feedback passages 29, 31, over which they communicate respectively with control channels 37, 41, may be looked upon as an enlarged section of the feedback passage 29. The flow rate of feedback fluid in either passage 29 or 31 is varied in accordance with the flow rate of fluid flowing in modulation flow channels 37 and 41 respectively. For example, assume that the fluid is flowing in an upward direction (as viewed in FIG. 1) in channel 37, and therefore in opposition to the downwardly directed feedback signal in passage 29. The velocity of the feedback fluid in passage 29 is decreased therefore decreasing the transit time of the feedback signal travelling from output passage 25 to control nozzle 15. This in turn increases the period of time during which the power stream remains directed toward output passage 25. If upward flow (as viewed in FIG. 1) is also present in control channel 41, the period of time during which the power stream is directed to output passage 27 is likewise increased. The overall result is a lower switching frequency for the power stream, providing a decrease in the oscillator output signal frequency. The flow rate in control flow channels 37 and 41 may similarly be in a downward direction in which case the frequency of oscillator 10 is increased. The extent to which the frequency of oscillator 10 is varied by flow in channels 37 and 41 depends upon the control flow rate. If the flow rates in channels 37 and 41 are unequal but in the same direction (for example assume upward in FIG. 1), the frequency of oscillator 10 will vary accordingly (decrease) but provides an oscillatory output signal which is asymmetrical; that is, the period during which the power stream is attached to one side wall of chamber 13 is greater than the period during which the power stream is attached to the opposite wall. For example, if the upward flow rate in channel 37 is greater than the upward flow rate in channel 41, the transit time for signals in feedback passage 29 is longer than the transit time for signals in feedback passage 31. The power stream therefore dwells at side wall 19 for a longer period of time than at side wall 21. Nevertheless, the power stream dwells along side wall 21 for a longer period of time than would be the case where no control fluid were applied to channel 41.

Figure 2A:
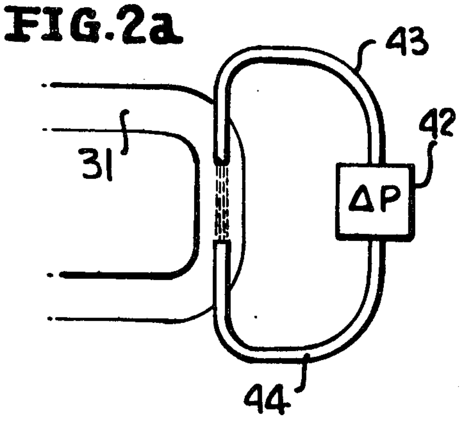
FIG. 2*a* is a partial schematic illustration of a modification of the embodiment of FIG. 2.

The precise configuration of FIG. 1, whereby the control flow and feedback flow are directed substantially parallel to one another, is not to be construed as limiting. For example, control flow which is directed angularly with respect to the feedback flow can accomplish the intended function, namely variation of the feedback signal velocity. In this regard it is the use of control flow to change the feedback flow which is important rather than precisely how the control flow is utilized. Likewise, the control flow may be arranged to flow annularly about the feedback flow, or alternatively, the feedback flow may be arranged to flow annularly about the control flow. An example of this latter configuration is illustrated in partial schematic form in FIG. 2*a*. Feedback flow in feedback passage 31 is augmented or retarded by control flow in either direction through axially aligned but separated tubes 43 and 44 which extend into the feedback passage. A pressure source 42 determines the magnitude and direction of the control flow and hence varies the frequency of oscillator 10.

Referring now to FIG. 2 of the accompanying drawings, there is illustrated another embodiment of the present invention which is configured to permit its utilization as an accelerometer. Oscillator 10′ is substantially identical to oscillator 10 of FIG. 1 except for the configuration of the feedback passages 29′ and 31′, and the control flow channels 37′ and 41′. Elements in oscillator 10′ bear the same reference numerals as corresponding elements in oscillator 10 of FIG. 1, but are primed in order to distinguish the two oscillators for the present description. The feedback channels 29′ and 31′ are substantially U-shaped and extend between their respective output passages and control nozzles. Similarly, control channels 37′ and 41′ are substantially U-shaped and open at their ends. The U-configuration is specified by way of example only; any curved configuration in which the open ends of a control channel face generally the same direction would suffice for purposes of this invention. Consider an axis noted as X extending perpendicular to the plane of interaction chamber 13′ and into the plane of the drawing in FIG. 2. If oscillator 10′ is stationary about axis X, the feedback flow through feedback passages 29′ and 31′ is substantially unaffected by the ambient fluid in channels 37′ and 41′ which for all intents and purposes is motionless except for possible entrainment produced by the feedback signal. Assume now that oscillator 10′, or more precisely the system in which oscillator 10′ is employed, is rotated in a counterclockwise direction in the plane of the drawing of FIG. 2 about axis X. The ambient fluid in channel 41′ is forced to flow in the same direction as the feedback signal in feedback passage 31′ due to the motion of the system. The ambient fluid in channel 37′, on the other hand, is forced to flow in a direction opposite that of the feedback signal in feedback channel 29'. The dwell time of the power stream, when directed toward output passage 27', is shorter due to the counterclockwise rotation of the system about axis X than is the dwell time of the power stream when directed toward output passage 25'. Consequently, oscillator 10' operates as a pulse width modulator, responsive to angular acceleration about axis X, whereby more fluid flows from one output passage than the other during each cycle of oscillator 10' in accordance with the angular acceleration of the unit about axis X. Prior art utilization of a pulse width modulated signal for detecting angular acceleration is described in my U.S. Pat. No. 3,276,464, incorporated herein by reference.

Oscillator 10' may be employed to measure angular acceleration about centerline CL extending through power nozzle 11' and divider 23' by simply rotating the feedback passages and flow channels by 90° such that a portion of each extends above the plane of the drawing in FIG. 2 and another portion of each extends below the plane of the drawing. Similarly, angular acceleration about an axis extending transversely of power stream flow and in the plane of the drawing of FIG. 2 may be accomplished by rotating the feedback passages and flow channels both downwardly relative to the plane of the paper or upwardly relative to the plane of the drawing.

Utilization of the frequency modulator oscillator of the present invention as a flow sensor is illustrated schematically in FIG. 3. An oscillator 10 of the type illustrated in FIG. 1 is disposed such that modulating flow channels 37 and 41 receive substantially equal amounts of fluid flowing in a pipe or conduit 51. The flow rate in pipe 51, which may be in either direction, is to be sensed by element 10. As described in detail above relative to FIG. 1, the flow from left to right in pipe 51 opposes the feedback flow relative to passages 29 and 31 so that the frequency of element 10 is decreased from its nominal operating frequency by an amount related to the flow rate of fluid in pipe 51. Similarly, right to left flow in pipe 51 aids the feedback flow in passages 29 and 31 so as to increase the frequency of oscillator 10 in accordance with the flow rate of the sensed flow.

Figure 4:
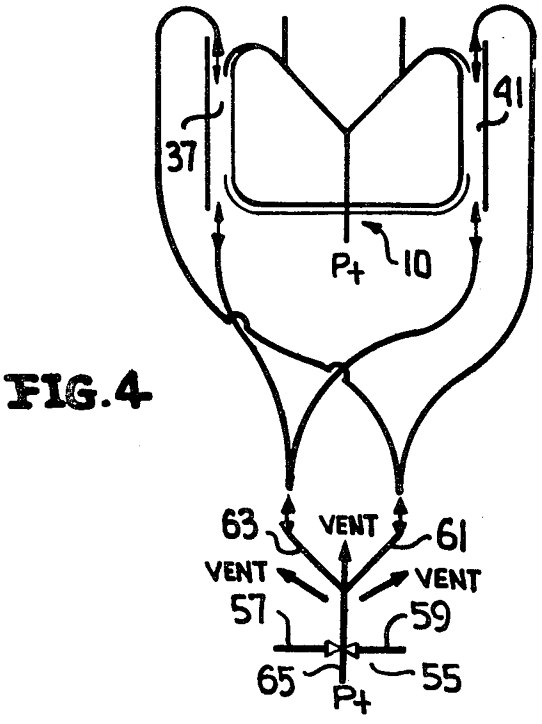
FIG. 4 is a schematic illustration of specific circuits utilizing the principles of the present invention.

A technique for utilizing oscillator 10 of FIG. 1 as a frequency modulator device in which the frequency can be selectively varied in accordance with an input signal is illustrated schematically in FIG. 4. Oscillator 10, designated by the same reference numerals employed in FIG. 1, receives selectively adjustable modulation flow in either of two directions in its modulation channels 37 and 41. The flow is selectively adjustable by means of a flow through analogue type fluidic amplifier 55. Amplifier 55, by way of example, may be of the type described in U.S. Pat. application Ser. No. 489,988 filed Sept. 24, 1965 by Carmine V. DiCamillo, now abandoned. Amplifier 55 operates in a manner which is similar to most fluidic analogue amplifiers of the stream interaction type but wherein it is adapted to provide fluid flow from either output passage, through a load, and back through either output passage and into the interaction region of the amplifier from which is it vented. Output flow from the amplifier may be had from only one output passage at any given time, the other output passage serving to receive the flow after it has passed through the load. Amplifier 55 comprises power nozzle 65, left and right control nozzles 57 and 59, and left and right output passages 63 and 61. Output flow from left output passage 63 is branched into two paths which apply fluid to modulation flow channels 37 and 41 in a direction which in each case opposes the feedback flow in the adjacent feedback passage. The flow is returned from both of channels 37 and 41 to output passage 61 of amplifier 55 which receives the flow and conducts it to the interaction chamber of the amplifier from which it is vented. The flow from output passage 61 of amplifier 55 is divided so as to flow through modulation flow channels 37 and 41 in aiding relation to feedback fluid in the respective feedback channels, the flow then being conducted back to output passage 63 of amplifier 55 from which it is vented.

If the signal at control nozzle 57 exceeds that at control nozzle 59, the power stream will be directed toward output passage 61 to a degree determined by the magnitude of the difference between the signals applied in nozzles 57 and 59. Similarly, if the signal applied to control nozzle 59 exceeds that at control nozzle 57, the power stream flow is directed toward output passage 63 to a degree determined by the difference in magnitude between the signals applied to control nozzles 59 and 57. It is seen therefore that the flow magnitude and direction in channels 37 and 41 can be simultaneously and selectively varied so as to selectively vary the output signal frequency from oscillator 10. In this manner, a differential pressure signal applied across control nozzles 57 and 59 can produce a frequency modulation at oscillator 10 which is a direct function of the amplitude of the differential pressure signal.

While I have described and illustrated specific embodiments of my invention, it will be clear that variations of the details of construction which are specifically illustrated and described may be resorted to without departing from the true spirit and scope of the invention as defined in the appended claims.

I claim:

1. A fluidic frequency modulator for providing an oscillatory output signal having a frequency which is a function of the amplitude of a fluid input signal, said modulator comprising:

a fluidic oscillator of the negative feedback type in which the oscillator frequency is a function of the velocity of a feedback fluid signal flowing in a negative feedback fluid passage;

modulator means for flowing additional fluid through at least a portion of said negative feedback fluid passage to alter the velocity of said negative feedback fluid signals as a function of the flow rate of said additional fluid; and means responsive to the amplitude of said fluid input signal for varying the flow rate of said additional fluid;

wherein said at least a portion of said negative feedback fluid passage is of substantially larger cross section than the remainder of said negative feedback fluid passage and wherein said last mentioned means comprises an analog fluidic amplifier for providing said additional fluid at a flow rate which is proportional to the amplitude of said fluid input signal.

2. In combination:

a fluidic oscillator of the negative feedback type in which the oscillator frequency is a function of the velocity of a feedback fluid signal flowing in a negative feedback fluid passage; and modulator means for flowing additional fluid through at least a portion of said negative feedback passage to alter the velocity of said negative feedback fluid signals as a function of the flow rate of said additional fluid, said additional fluid being arranged to flow annularly about said feedback fluid signal.

3. In combination:

a fluidic oscillator of the negative feedback type in which the oscillator frequency is a function of the velocity of a feedback fluid signal flowing in a negative feedback fluid passage; and modulator means for flowing additional fluid through at least a portion of said negative feedback fluid passage to alter the velocity of said negative feedback fluid signal as a function of the flow rate of said additional fluid, said feedback fluid signal being arranged to flow annularly about said additional fluid.

4. A fluidic system for monitoring angular acceleration of the system about a predetermined axis, said system comprising:

a fluidic oscillator of the negative feedback type in which the oscillator frequency is a function of the velocity of a feedback fluid signal flowing in a negative feedback fluid passage; and modulator means for flowing additional fluid through at least a portion of said negative feedback fluid passage to alter the velocity of said negative feedback fluid signal as a function of the flow rate of said additional fluid;

wherein said at least a portion of said negative feedback fluid passage has a curved configuration and lies in a specified plane angularly disposed to said predetermined axis, said portion of said negative feedback passage being disposed relative to said axis such that angular acceleration of said system in a first direction about said axis increases the flow rate of said additional fluid and angular acceleration of said system in the opposite direction about said axis decreases the flow rate of said additional fluid.

5. A fluidic system for monitoring angular acceleration of the system about a predetermined axis, said system comprising:

a fluidic oscillator comprising: a power nozzle responsive to application of pressurized fluid thereto for issuing a power stream of fluid, a pair of control nozzles, each responsive to application of pressurized fluid thereto for issuing a control stream of fluid in interacting relationship with said power stream to deflect said power stream, said control nozzles being disposed such that their respective control streams deflect said power stream in opposite senses; a pair of outlet passages respectively disposed for receiving said power stream when deflected in said opposite senses; and a pair of negative feedback passages, one each interconnecting a respective output passage with a respective control nozzle such that fluid flow to one of said output passages is in part returned via said negative feedback passage to a control nozzle to deflect said power stream; and modulator means for flowing additional fluid through at least a portion of each of said negative feedback passages to alter the velocity of feedback fluid flowing therein as a function of the flow rate of said additional fluid;

wherein said at least a portion of each of said negative feedback fluid passages has a curved configuration and lies in a specified plane angularly disposed to said predetermined axis, said portion of said negative feedback passage being disposed relative to said axis such that angular acceleration of said system in a first direction about said axis increases the flow rate of said additional fluid and angular acceleration of said system in the opposite direction about said axis decreases the flow rate of said additional fluid.

6. In combination:

a flow channel;

means for flowing a first fluid stream through said flow channel at a variable flow rate;

supply means for issuing a second fluid stream through a portion of said flow channel within said first fluid stream and in a direction which is parrallel to the direction of said first fluid stream;

fluid passage means disposed in said fluid channel within said first fluid stream and in alignment with said supply means for receiving said second fluid stream at a velocity dependent upon the velocity of said first fluid stream; and fluid-operated means for effecting a specified operation as a function of the velocity of said second fluid stream received by said fluid passage means.

7. A fluid flow sensor for monitoring the flow velocity of fluid in a flow channel, said sensor comprising:

a fluidic oscillator of the negative feedback type in which the oscillator frequency is a function of the velocity of a feedback fluid signal flowing in a negative feedback fluid passage; and modulator means for flowing additional fluid through at least a portion of said negative feedback fluid passage to alter the velocity of said negative feedback fluid signal as a function of the flow rate of said additional fluid;

wherein said flow channel includes at least a portion of said negative feedback passage disposed such that said additional fluid is provided by said flow channel, whereby the oscillator frequency is a function of the flow velocity in said flow channel.

8. The flow sensor according to claim 7 wherein said at least a portion of said negative feedback fluid passage is of substantially larger cross section than the remainder of said negative feedback fluid passage.

9. A fluidic frequency modulator comprising the combination according to claim 7 wherein said modulator means includes means for selectively varying the flow rate of said additional fluid.

10. A fluid flow sensor for monitoring the flow velocity of fluid in a flow channel, said sensor comprising:

a fluidic oscillator comprising: a power nozzle responsive to application of pressurized fluid thereto for issuing a power stream of fluid, a pair of control nozzles, each responsive to application of pressurized fluid thereto for issuing a control stream of fluid in interacting relationship with said power stream to deflect said power stream, said control nozzles being disposed such that their respective control streams deflect said power stream in opposite senses; a pair of outlet passages respectively disposed for receiving said power stream when deflected in said opposite senses; and a pair of negative feedback passages, one each interconnecting a respective output passage with a respective control nozzle such that fluid flow to one of said output passages is in part returned via said negative feedback passage to a control nozzle to deflect said power stream; and modulator means for flowing additional fluid through at least a portion of each of said negative feedback passages to alter the velocity of feedback fluid flowing therein as a function of the flow rate of said additional fluid;

wherein said flow channel includes at least a portion of each of said pair of negative feedback passages disposed such that said additional fluid is provided by said fluid channel, whereby the oscillator frequency is a function of the flow velocity in said channel.

11. A fluidic frequency modulator comprising the combination according to claim 10 wherein said modulator means includes means for selectively varying the flow rate of said additional fluid.

12. A fluidic frequency modulator for providing an oscillatory output signal having a frequency which is a function of the amplitude of a fluid input signal, said modulator comprising the combination according to claim 10 and further comprising means responsive to the amplitude of said fluid input signal for varying the flow rate of said additional fluid.

13. The frequency modulator according to claim 12 wherein said at least a portion of each of said pair of negative feedback fluid passages is of substantially larger cross section than the remainder of said negative feedback fluid passage and wherein last mentioned means comprises an analog fluidic amplifier for providing said additional fluid at a flow rate which is proportional to the amplitude of said fluid input signal.

14. A fluidic flow sensor for monitoring the flow rate of a flowing fluid, comprising:

supply means for issuing a flow sensing stream of fluid generally parallel to and within said flowing fluid such that said flowing fluid interacts with and varies the velocity of said sensing stream as a function of the flow rate of said flowing fluid;

fluid passage means aligned with said supply means for receiving said sensing stream at a pressure which varies with the velocity of said flowing fluid; and fluid-operated means arranged to respond to the pressure of the sensing stream fluid received by said fluid passage means.

15. The flow sensor according to claim 14 wherein said fluid-operated means comprises a fluidic oscillator.

References Cited

UNITED STATES PATENTS

| | | | |
|---|---|---|---|
| 3,158,166 | 11/1964 | Warren | 137—81.5 |
| 3,185,166 | 5/1965 | Horton et al. | 137—81.5 |
| 3,228,410 | 1/1966 | Warren et al. | 137—81.5 |
| 3,232,305 | 2/1966 | Groeber | 137—81.5 |
| 3,276,464 | 10/1966 | Metzger | 137—81.5 |
| 3,425,432 | 2/1969 | Langley | 137—81.5 |
| 3,438,384 | 4/1969 | Hurvitz | 137—81.5 |
| 3,444,879 | 5/1969 | McLeod | 137—81.5 |
| 3,450,145 | 6/1969 | Colston | 137—81.5 |
| 3,468,326 | 9/1969 | Cohen | 137—81.5 |
| 3,474,805 | 10/1969 | Swartz | 137—81.5 |
| 3,348,562 | 10/1967 | Ogren | 137—81.5 |
| 3,495,253 | 2/1970 | Richards | 137—81.5 |

SAMUEL SCOTT, Primary Examiner